Patented June 26, 1951

2,558,570

UNITED STATES PATENT OFFICE 2,558,570

BIMETALLIC THERMOMETER

Anthony H. Lamb, Hillside, N. J., assignor to Weston Electrical Instrument Corporation, Newark, N. J., a corporation of New Jersey Application April 22, 1947, Serial No. 743,183

1 Claim. (Cl. 73—349)

This invention relates to bimetallic thermometers and more particularly to thermometers for use under conditions which give rise to cyclic pulsations or vibration.

This vibration effect may arise when the thermometers are used in a pipe line near a reciprocating pump, in grain or pulverized coal chutes, or in the exhaust passage of a Diesel engine.

It is well known that the cylinders of a multiple cylinder Diesel engine may not carry their proportionate share of the load when the fuel injection valves of the several cylinders do not respond uniformly to the governor control. The temperatures of the exhaust gases from the several cylinders afford an indication of the load distribution, and a check upon the operating conditions may be had by measuring the temperatures of the gases exhausted from the several cylinders. The exhaust gas temperatures are at least approximately identical when each cylinder carries its share of the load and, conversely, any wide departure from equality is an indication that one or more of the Diesel engine cylinders is not carrying its proportionate share of the load. The prior types of bimetallic thermometers have not been satisfactory for use with Diesel engines as the bearings and/or the staff of the thermometer have been damaged by the rhythmical blast of the exhaust, and the thermometer casing has been destroyed by overheating when deposits of hydrocarbons on the thermometer tube ignite and burn.

Objects of the present invention are to provide bimetallic thermometers which avoid or eliminate the defects of the prior constructions. An object is to provide bimetallic thermometers which are mechanically stable when introduced into a pulsating stream of fluid or of granulated solid particles. More specifically, an object is to provide bimetallic thermometers which include shielding to prevent damage from pulse vibrations or excessive heating.

Figure 1:
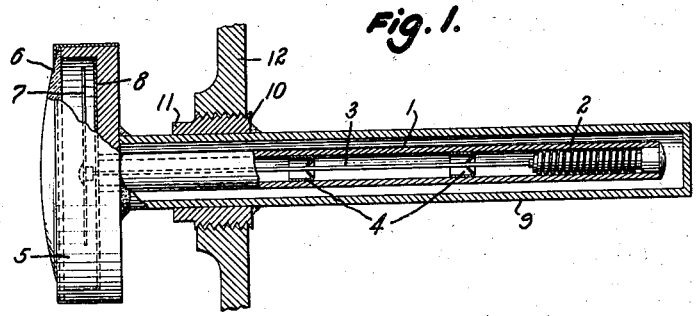
Figure 2:
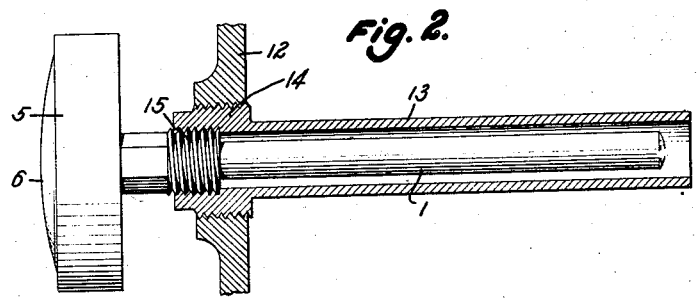

These and other objects and advantages of the invention will be apparent from the following specification when taken with the accompanying drawing in which:

Fig. 1 is a longitudinal central section through a thermometer embodying the invention; and Fig. 2 is an elevation, with parts in longitudinal section, of another embodiment.

In the drawings, the reference numeral 1 identifies the elongated tube or stem within which a bimetallic element 2 is mounted. One end of the bimetallic element is anchored on the stem at or adjacent its closed inner end, and a staff or pointer shaft 3 is secured to the other end of the bimetallic element. The pointer shaft extends through and is loosely guided for angular movement by a number of ring bearings 4 which are secured within the stem 1 by a force fit, staking or welding. A casing 5 with a glass or plastic cover plate 6 is welded or otherwise secured to the stem 1 to provide a hermetically sealed housing for the thermometer. A pointer 7 is mounted on the outer end of the staff 3 for cooperation with a scale plate 8.

The parts so far described are typical of conventional constructions which have not been satisfactory when subject to continuous vibration, for example when used for the measurement of the exhaust gas temperatures of Diesel engines. The rhythmic blast of the exhaust sets up vibrations which cause excessive wear on the staff 3 and the bearings 4. The bimetallic element is also subject to damage from local heating as oil and carbon which are deposited upon the stem 1 ignite and burn from time to time.

According to this invention, a protective tube or shell is arranged outside the thermometer stem 1 to shield the latter from vibration and from the oil and carbon present in the exhaust gases. As shown in Fig. 1, this protective shell is a tube 9 which is welded or brazed to the casing 5. The tube 9 is of substantially larger diameter than the stem 1 and, as shown, is closed at its inner end. An externally threaded ring or collar 10 is welded or brazed to the tube 9 adjacent its outer end, and the outer part 11 of the ring is of hexagonal or other non-circular cross-section to receive a wrench for turning the ring 10 into a threaded opening in a wall 12 of the exhaust passage of one cylinder of a Diesel engine.

Alternatively, as shown in Fig. 2, the protective shell is an open ended tube 13 having a threaded shoulder 14 for mounting the tube in the exhaust passage wall 12, the tube 13 having internal threads at its outer end to receive the threaded mounting head 15 which extends rearwardly from the back wall of the casing 5 of a bimetallic thermometer. The time lag of the thermometer is somewhat shorter when the outer end of the protective tube is open, but the protection against vibration is not complete when the tube end is open. The choice between the open end and closed end construction may depend upon the path of the exhaust gas stream in some instances, and it may be a matter of personal preference in other cases.

I claim:

Apparatus for measuring the temperature of a pulsating fluent stream; said apparatus comprising the combination with a bimetallic thermometer including a bimetallic element, an elongated tubular stem having a closed inner end within which said bimetallic element is located, one end of the bimetallic element being secured to said stem, a shaft secured to the other end of said bimetallic element, a ring bearing mounted within said stem and loosely guiding said shaft for angular movement, a pointer carried by said shaft, a graduated scale plate over which said pointer is displaced by said bimetallic element, a casing enclosing said graduated scale plate and cooperating with said tubular stem to form the housing of said bimetallic thermometer; of shield means surrounding and radially spaced from contact with said tubular stem to prevent said pulsating fluent stream from imparting mechanical vibration to said tubular stem, said shield means comprising a cylindrically imperforate tube having an open inner end projecting axially beyond the inner end of said hollow stem, whereby pressure surges established within said tube by the pulsating fluent stream move axially of the tubular thermometer stem, and an externally threaded collar at the outer end of said tube for mounting the thermometer and shield means in a correspondingly threaded opening of a wall of a passage traversed by the pulsating fluent stream, said shield means being mechanically connected to said thermometer housing.

ANTHONY H. LAMB.

REFERENCES CITED

The following references are of record in the file of this patent:

UNITED STATES PATENTS

| Number | Name | Date |
|---|---|---|
| 365,905 | Brewster | July 5, 1887 |
| 899,313 | Maurer | Sept. 22, 1908 |
| 1,787,327 | Schlaich | Dec. 30, 1930 |
| 1,933,801 | Hart | Nov. 7, 1933 |
| 1,991,371 | Blanckenburg | Feb. 19, 1935 |
| 2,161,432 | Rees | June 6, 1939 |
| 2,343,372 | Ford et al. | Mar. 7, 1944 |

FOREIGN PATENTS

| Number | Country | Date |
|---|---|---|
| 123,118 | Switzerland | Dec. 16, 1927 |